2,935,544
PROCESS AND CATALYST FOR THE ISOMERIZATION OF N-PARAFFINS

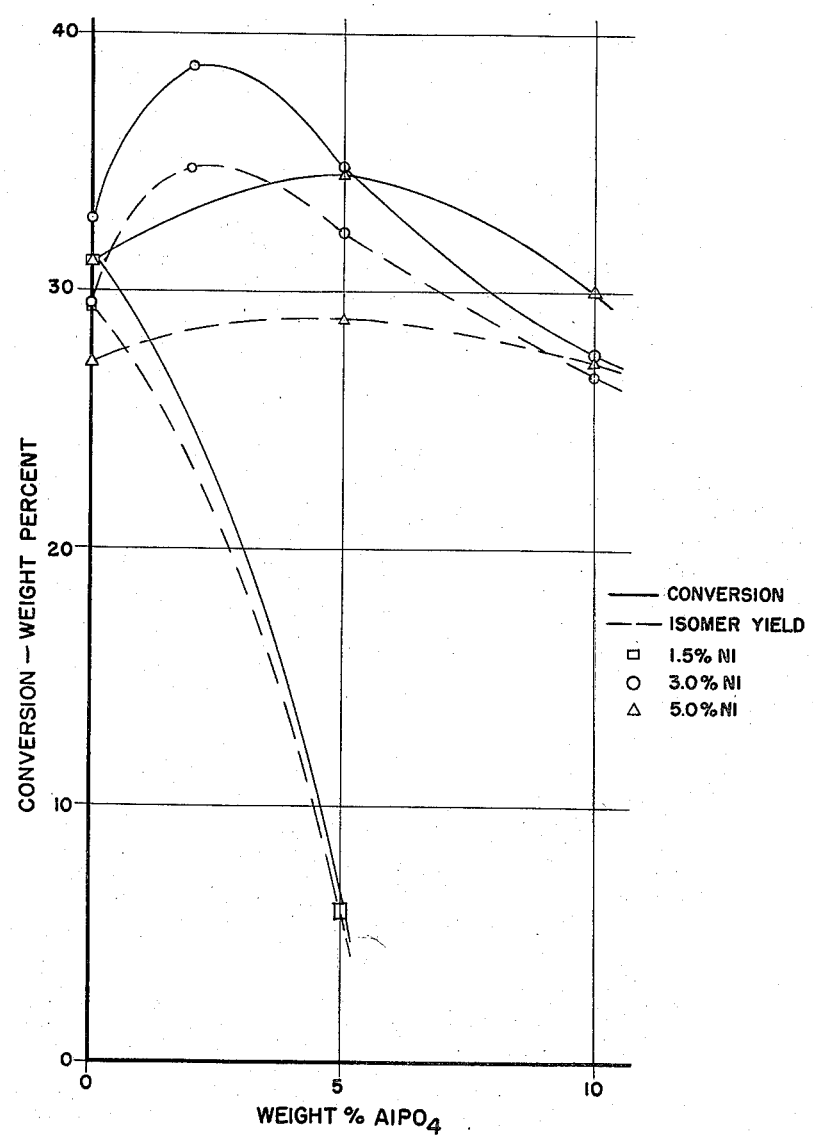

Elmer L. Miller, Cary, and Hillis O. Folkins, Crystal Lake, Ill., assignors to The Pure Oil Company, Chicago, Ill., a corporation of Ohio Application December 20, 1957, Serial No. 704,138

8 Claims. (Cl. 260—683.65)

This invention relates to a novel process for isomerizing hydrocarbons and to catalysts useful in such processes. It is more particularly concerned with the isomerization of normal paraffinic hydrocarbons containing 4 to 8 carbon atoms in the molecule and to catalysts for promoting such processes.

We have discovered that if nickel-promoted, silica-alumina, hydroisomerization catalysts are promoted with a critical amount of a metal phosphate selected from the group consisting of aluminum, calcium, magnesium, zirconium, beryllium and strontium, not only is the resulting catalyst superior to the nickel catalyst not containing a phosphate with respect to sensitivity and life, but such catalysts exhibit a substantial increase in isomerization activity.

It is an object of this invention to provide a novel isomerization catalyst. Another object of the invention is to provide an improved hydroisomerization process for isomerizing normal paraffinic hydrocarbons. A further object of the invention is to provide a hydroisomerization catalyst of low sensitivity to reaction conditions, long life and high reactivity. Other objects of the invention will manifest themselves from the following description and accompanying drawing, of which the figure is a graph showing the effect of nickel and aluminum phosphate content on the activity and selectivity of the catalyst in the isomerization of normal pentane.

The preferred method of preparing catalysts in accordance with our invention consists in adding the metal phosphate to the already calcined acidic support, calcining the resulting composition and subsequently adding the nickel in a suitable manner. The following example giving the preparation of a catalyst composed of 5% of aluminum phosphate, and 3% of nickel, composited with a silica-alumina catalyst containing 75% by weight of silica and 25% by weight of alumina, is typical of the manner of preparing catalysts in accordance with this invention.

EXAMPLE I 43.0 grams of aluminum nitrate, $Al(NO_3)_3 \cdot 9H_2O$, were dissolved in 425 ml. of distilled water. To this solution was added, with rapid stirring, 250 grams of a microspheroidal silica-alumina (25% alumina) commercial fluid cracking catalyst (Davison-High Alumina, Oil & Gas Journal, p. 121 et seq., October 17, 1955). After stirring 30 minutes, an aqueous solution of 15.0 grams of $(NH_4)_2HPO_4$ in 250 ml. of distilled water was slowly added to precipitate the aluminum phosphate in the pores of the silica-alumina support. The resultant mixture was stirred 30 minutes, allowed to stand one hour, and filtered. The resultant loose cake was dried at 230° F. overnight, and calcined by gradually increasing the temperature to 1150° F. and calcining at that temperature for six hours.

190 grams of the above catalyst support were slurried into a nickel nitrate solution consisting of 30.0 grams of $Ni(NO_3)_2 \cdot 6H_2O$ in 250 ml. of distilled water. To this, with stirring, was added a solution containing 27 grams of $(NH_4)_2CO_3 \cdot H_2O$ in 250 ml. of water. This mixture was stirred 15 minutes and the supernatant liquid was filtered off. The cake was dried at 230° F. for 16 hours. The resulting dried catalyst was pelleted into ⅛″ pellets and activated. The activation procedure employed for the testing of this catalyst consisted in heating the catalyst slowly to 975° F. in a stream of hydrogen over a period of five hours and subsequently maintaining the catalyst in hydrogen flow for 16 hours. Following this the catalyst was oxidized at 975° F. in a stream of air for about 1 hour, cooled to 800° F. in air, and reduced at subatmospheric pressure in a stream of hydrogen for one hour.

A number of tests were made on catalysts to demonstrate the ability of catalysts prepared in accordance with this invention to retain their activity as compared to catalysts not containing the phosphate salt. Because these catalysts are sensitive to process conditions and lose activity with time on stream at low hydrogen/hydrocarbon ratios, experiments were chosen in which the activity and relative stability of the individual catalysts could be readily compared. Thus, activities were initially determined, in the first half-hour of a run, at a hydrogen/hydrocarbon mol ratio of 0.5, after which the ratio was decreased to 0.25 and the run continued. At a hydrogen/hydrocarbon mol ratio of 0.25, degeneration rates are greatly accelerated and thus a comparison of results obtained over the various catalysts provides a direct measure of their relative stabilities. Hence, the data presented in Table I show the activity for each catalyst at a hydrogen/hydrocarbon mol ratio of 0.5 in the first line, and in the second line is shown the activity after a certain period of time under accelerated degenerative conditions (i.e., at a hydrogen/hydrocarbon mol ratio of 0.25). From these data the relative stabilities of the different catalysts are readily apparent. The other operating conditions in all the runs were as follows: temperature, 700° F.; pressure, 350 p.s.i.g.; and liquid volume hourly space velocity, 4.5. n-Pentane was used as charge stock in all these experiments.

Table I.—*Isomerization of n-pentane*

| Catalyst—5% Ni-(75—25) Silica-alumina having incorporated therein the following phosphates: | Time (hrs.) | Yield Data, Percent | | |
|---|---|---|---|---|
| | | Conversion | Yield | Selectivity |
| None | 0.50 | 40.0 | 31.9 | 79.8 |
|  | 3.12 | 16.3 | 13.3 | 81.8 |
| Lithium | 0.77 | 23.6 | 14.2 | 60.1 |
|  | 1.92 | 15.6 | 12.0 | 77.0 |
| Beryllium | 0.33 | 38.2 | 30.3 | 79.4 |
|  | 3.50 | 29.4 | 27.5 | 93.4 |
| Magnesium | 0.48 | 24.8 | 18.6 | 74.8 |
|  | 2.75 | 20.3 | 17.8 | 87.4 |
| Calcium | 0.45 | 23.4 | 14.7 | 62.9 |
|  | 3.07 | 21.1 | 17.4 | 82.5 |
| Strontium | 0.80 | 20.6 | 14.6 | 70.9 |
|  | 4.63 | 17.6 | 13.9 | 79.2 |
| Boron | 0.50 | 36.6 | 30.1 | 82.2 |
|  | 3.08 | 13.0 | 11.1 | 85.1 |
| Aluminum | 0.50 | 36.9 | 30.3 | 82.0 |
|  | 2.40 | 27.7 | 26.1 | 94.0 |
| Zirconium | 0.80 | 37.7 | 30.0 | 79.5 |
|  | 3.38 | 19.4 | 15.7 | 80.9 |
| Nickel | 0.50 | 34.8 | 30.9 | 88.8 |
|  | 2.65 | 17.3 | 15.3 | 88.5 |

From the foregoing table it will be seen that the unstabilized catalyst diminishes rapidly with time. Certain other phosphates, including lithium, boron and nickel, have a detrimental effect on the stability of the catalyst. In contradistinction, the phosphates included within this invention have a significant stabilizing effect, as evidenced by a comparison of the conversion and yield data at the two time periods given.

In order to demonstrate the increased activity of catalysts made in accordance with this invention in the hydroisomerization of paraffinic hydrocarbons, a series of runs were made on catalysts in which a 75/25 silica-alumina cracking catalyst was composited with aluminum phosphate and nickel in the manner disclosed in Example I using different amounts of aluminum phosphate and nickel, and the results of these runs compared with runs in which the silica-alumina catalyst was composited only with nickel. These runs were all carried out at 700° F., a pressure of 500 p.s.i.g., a liquid weight hourly space velocity of 2.45, and a hydrogen-to-hydrocarbon mol ratio of 1. Prior to each run the catalyst was regenerated by oxidizing it in a stream of air at 975° F. and atmospheric pressure for a period of about one hour, cooling to 800° F. in air, purging the catalyst with nitrogen, then reducing with a stream of substantially dry hydrogen at a temperature of about 825° F. for a period of one hour, and equilibrating the regenerated dry catalyst with hydrogen containing water vapor equivalent to 25 mm. of mercury partial pressure, at 975° F. and atmospheric pressure, for about one hour. The results of these runs are set forth in Table II.

*Table II*

| Weight, Percent | | Weight, Percent | | |
|---|---|---|---|---|
| Ni | AlPO₄ | Conversion | Yield | Selectivity |
| 1.5 | 0 | 31.0 | 29.5 | 95 |
| 1.5 | 5 | 6.0 | 5.9 | 98 |
| 3 | 0 | 32.6 | 29.7 | 91 |
| 3 | 2 | 38.7 | 34.8 | 90 |
| 3 | 5 | 34.9 | 32.3 | 93 |
| 3 | 10 | 27.5 | 26.6 | 97 |
| 5 | 0 | 31.0 | 27.3 | 88 |
| 5 | 5 | 34.6 | 28.9 | 84 |
| 5 | 10 | 30.0 | 27.3 | 91 |

The results obtained in the runs recorded in Table II are shown graphically in the accompanying figure.

From the table and the accompanying figure it will be seen that increase in the nickel content of the catalyst which does not contain aluminum phosphate has the effect of lowering the selectivity of the catalyst without substantially increasing the conversion. It will be further seen that amounts of aluminum phosphate as high as 10%, while favorably affecting the selectivity of the catalyst, have a deleterious effect on the conversion. On the other hand, where the amount of aluminum phosphate is in the range of about 2–5% with the nickel present in the amounts of 3–5%, significant improvement in conversion is obtained, but only in the case where the catalyst contains 3% of nickel is there both a significant improvement in conversion and yield. At nickel levels of 1.5% the presence of phosphate actually decreases activity and yield, although improving selectivity.

Additional runs were carried out in which the catalyst used was prepared in the manner described in connection with those used to obtain the results in Table II, except that calcium phosphate was used instead of aluminum phosphate. The data on these runs are set forth in Table III. These runs were carried out under the same conditions as those used for the runs reported in Table II.

*Table III*

| Weight, Percent | | Weight, Percent | | |
|---|---|---|---|---|
| Ni | Ca Phosphate | Conversion | Yield | Selectivity |
| 3 | 2 | 28.9 | 26.6 | 92 |
| 5 | 2 | 38.6 | 34.1 | 88 |

By comparing the data in Table III with the data for those runs using only nickel catalyst in Table II, it will be seen that the calcium phosphate in the amount of 2% by weight depressed the activity of the 3% nickel catalyst without any significant improvement in selectivity, while it significantly improved the activity of the 5% nickel catalyst without affecting selectivity.

The data indicates, therefore, that at a nickel level of about 0.5 to 8% the catalyst can be improved with regard to life and sensitivity by incorporating from 1–15% by weight of a phosphate of one of the metals hereinbefore disclosed, but that in order to improve the activity of the catalyst as well, there must be a definite relation between the amount of nickel and the phosphate present. The data further shows that with regard to the aluminum phosphate substantial improvement in the catalyst can be obtained if the catalyst contains from 3–5% of nickel and from 2–5% of aluminum phosphate. With regard to the calcium phosphate catalyst, the data show that significant improvement in conversion is not obtained until the nickel content is at least about 5%.

In the preparation of the stabilized catalyst of this invention, the refractory, acidic, oxide composite can be prepared according to any suitable prior art technique. The oxides, with or without silica, are synthetically prepared by separate, successive, or co-precipitation techniques. The acid-treated clays are prepared by the acid-treating of naturally-occurring clays of the montmorillonite type.

The refractory, acidic, oxide support is composited, either without drying and/or calcining, with the metal phosphate in any suitable manner. It is generally preferred to add the metal phosphate to the silica-alumina or other acidic support, and to calcine the resulting composition before the addition of the nickel or other active metal component. The phosphate may be added by impregnation or precipitation methods to the undried silica-alumina gel, or it may be added by impregnation or precipitation on an already calcined acidic support, such as silica-alumina. Satisfactory results, however, can be obtained by incorporating the metal phosphate in the composite catalyst subsequent to or simultaneously with the addition of the hydrogenation component to the refractory, acidic, oxide support.

The nickelous hydrogenation component is included in the catalyst composition using conventional techniques such as precipitation, impregnation, or others. For example, see Catalysis, Emmett, Reinhold, Chap. 7. Although metallic nickel is employed as the illustrative nickelous hydrogenation agent in the specific example, other nickel compositions can be used, such as nickel molybdate, nickel tungstate, nickel chromate, nickel borate, nickel manganate, etc.

Although for purposes of demonstrating the invention temperatures of 700° F. were used in the various runs, it should be understood that this is not necessarily the optimum temperature for pentane isomerization. As a matter of fact, temperatures approaching the upper limit of the temperature range will give higher conversions. For example, a run conducted at 740° F., 500 p.s.i.g., liquid volume hourly space velocity of 3, and a hydrogen-to-hydrocarbon ratio of 1, with a catalyst composed of 75% silica and 25% alumina, promoted with 3% nickel and 5% aluminum phosphate, gave a conversion of 44.9% with a yield of isopentane of 42.4% and a selectivity of 94.4%. With the same catalyst at 700° F., and the remaining conditions the same, the conversion was 29%, the yield 28.3% and the selectivity 97.5%.

Moreover, the particular silica-alumina catalyst used in the runs is not necessarily the best ratio of silica-alumina in the catalyst. Generally speaking, the catalyst is more active as the ratio of silica to alumina approaches the maximum of 87 to 13. While the 87/13 catalyst is more active than the 75/25 catalyst, more hydrocracking accompanies the isomerization reaction with the result that the selectivity is lower. As an example, using a 3% nickel 5% aluminum phosphate on 87/13 silica-alumina catalyst at 700° F., 500 p.s.i.g., liquid volume hourly space velocity of 3, and hydrogen-to-hydrocarbon ratio of 1, the conversion obtained was 43.1% with a yield of 37.5% and a selectivity of 87%. The silica and alumina content of the catalyst may vary within the limits of about 50–87% by weight of silica to 50–13% by weight of alumina.

The instant invention is employed in the isomerization of saturated, isomerizable hydrocarbons having 4–8 carbon atoms per molecule. Feed stocks which can be used include pentane, heptane, hexane, or mixtures thereof, such as virgin petroleum distillates having a boiling range up to about 210° F., natural gasolines, light catalytic reformate, hydrogenated light coker naphtha, and others. Operating conditions selected for the isomerization of these feed stocks are employed, viz.:

|  | Range | Preferred |
| --- | --- | --- |
| Temperature, °F | 600–750 | 650–725 |
| Pressure, p.s.i.g | 180–1,000 | 350–750 |
| Liquid Volume Hourly Space Velocity | 0.1–10 | 0.5–5.0 |
| $H_2$/hydrocarbon mol ratio | 0.1–4.5 | 0.5–3.5 |

It is evident that modifications and variations within the scope of this invention will be apparent to those skilled in this art. Accordingly, the instant invention is limited, not by the foregoing discussion and specific embodiments, but only as defined by the following claims.

We claim as our invention:

1. A catalyst composition consisting essentially of a major portion of refractory, mixed oxides containing about 50–87% of silica and 50–13% by weight of alumina and having acidic properties, composited with nickel in an amount of not less than about 3% nor more than about 5% by weight, and a phosphate of a metal from the group consisting of aluminum and calcium in an amount of about 2–5% by weight, said nickel being present in an amount of 5% by weight when calcium phosphate is present in the catalyst.

2. A catalyst in accordance with claim 1 in which the nickel is present in the amount of 5% by weight and the phosphate is calcium and it is present in the amount of 2% by weight.

3. A catalyst in accordance with claim 1 in which the phosphate is aluminum phosphate.

4. A catalyst in accordance with claim 3 in which the nickel is present in an amount of about 3% by weight and the aluminum phosphate is present in the amount of about 2% by weight.

5. The process of hydroisomerizing normal paraffinic hydrocarbons having 5 to 7 carbon atoms per molecule, comprising contacting said hydrocarbons mixed with hydrogen at temperatures of about 600–750° F. and pressures of about 180–1000 p.s.i.g., and at suitable space velocity and hydrogen-to-hydrocarbon ratio to promote isomerization, with catalyst defined in claim 1.

6. The process of hydroisomerizing normal paraffinic hydrocarbons having 5 to 7 carbon atoms per molecule, comprising contacting said hydrocarbons mixed with hydrogen at temperatures of about 600–750° F. and pressures of about 180–1000 p.s.i.g., and at suitable space velocity and hydrogen-to-hydrocarbon ratio to promote isomerization, with the catalyst defined in claim 3.

7. The process of hydroisomerizing normal paraffinic hydrocarbons having 5 to 7 carbon atoms per molecule, comprising contacting said hydrocarbons mixed with hydrogen at temperatures of about 600–750° F. and pressures of about 180–1000 p.s.i.g., and at suitable space velocity and hydrogen-to-hydrocarbon ratio to promote isomerization, with the catalyst defined in claim 4.

8. The process of hydroisomerizing normal paraffinic hydrocarbons having 5 to 7 carbon atoms per molecule, comprising contacting said hydrocarbons mixed with hydrogen at temperatures of about 600–750° F. and pressures of about 180–1000 p.s.i.g., and at suitable space velocity and hydrogen-to-hydrocarbon ratio to promote isomerization, with the catalyst defined in claim 2.

References Cited in the file of this patent

UNITED STATES PATENTS

| 2,084,511 | Small | June 22, 1937 |
| 2,441,297 | Stirton | May 11, 1948 |
| 2,569,092 | Deering | Sept. 25, 1951 |

FOREIGN PATENTS

| 579,427 | Great Britain | Aug. 2, 1946 |
| 487,392 | Canada | Oct. 21, 1952 |

OTHER REFERENCES

Thorpe: "Dictionary of Applied Chemistry," volume II, page 505 (Longmans, Green, & Co., 1921).